United States Patent
Hwang et al.

(10) Patent No.: US 8,545,159 B2
(45) Date of Patent: Oct. 1, 2013

(54) APPARATUS HAVING CONVEYOR AND METHOD OF TRANSFERRING SUBSTRATE USING THE SAME

(75) Inventors: Chul-Joo Hwang, Gyeonggi-do (KR); Yong-Jin Kim, Gyeonggi-do (KR)

(73) Assignee: Jusung Engineering Co., Ltd. (KR)

( * ) Notice: Subject to any disclaimer, the term of this patent is extended or adjusted under 35 U.S.C. 154(b) by 1586 days.

(21) Appl. No.: 10/956,389

(22) Filed: Oct. 1, 2004

(65) Prior Publication Data
US 2005/0074312 A1    Apr. 7, 2005

(30) Foreign Application Priority Data

Oct. 1, 2003  (KR) .......................... 10-2003-0068347
Sep. 25, 2004  (KR) .......................... 10-2004-0077541

(51) Int. Cl.
*B65G 49/07* (2006.01)
*H01L 21/677* (2006.01)

(52) U.S. Cl.
USPC ............................. 414/217; 414/935; 414/939

(58) Field of Classification Search
USPC .......................................... 414/217; 118/728
See application file for complete search history.

(56) References Cited

U.S. PATENT DOCUMENTS

| | | | | |
|---|---|---|---|---|
| 4,047,624 A | * | 9/1977 | Dorenbos | 414/217 |
| 4,483,651 A | * | 11/1984 | Nakane et al. | 414/217 |
| 4,932,864 A | * | 6/1990 | Miyabe | 432/128 |
| 5,196,676 A | * | 3/1993 | Hallahan | 219/388 |
| 5,275,709 A | * | 1/1994 | Anderle et al. | 204/298.25 |
| 5,425,611 A | * | 6/1995 | Hughes et al. | 414/217 |
| 6,288,366 B1 | * | 9/2001 | Dings | 219/388 |
| 6,471,459 B2 | * | 10/2002 | Blonigan et al. | 414/217 |
| 6,577,923 B1 | * | 6/2003 | White et al. | 700/245 |
| 7,025,554 B2 | * | 4/2006 | Ozawa et al. | 414/217 |
| 2003/0103836 A1 | * | 6/2003 | Beaulieu et al. | 414/217 |
| 2003/0135615 A1 | | 7/2003 | Wyatt | |
| 2005/0191155 A1 | * | 9/2005 | Sakiya | 414/217 |
| 2006/0177288 A1 | * | 8/2006 | Parker et al. | 414/217 |

FOREIGN PATENT DOCUMENTS

| | | |
|---|---|---|
| CN | 1396007 A | 2/2003 |
| JP | 11-131232 | 5/1999 |

* cited by examiner

*Primary Examiner* — Scott Lowe

(57) ABSTRACT

An apparatus for a liquid crystal display device includes: a process chamber for treating a substrate; a load-lock chamber having an interior conveyor; and a transfer chamber connected to the process chamber and the at least one load-lock chamber, the transfer chamber having a substrate-transferring means.

23 Claims, 5 Drawing Sheets

APPARATUS HAVING CONVEYOR AND METHOD OF TRANSFERRING SUBSTRATE USING THE SAME

CROSS REFERENCE TO RELATED APPLICATIONS

The present invention claims the benefit of Korean Patent Applications No. 2003-0068347 filed in Korea on Oct. 1, 2003 and No. 2004-0077541 filed in Korea on Sep. 25, 2004, which are hereby incorporated by references.

BACKGROUND OF THE INVENTION

The present invention relates to an apparatus for a liquid crystal display device, and more particularly, to an apparatus where large-sized substrates are exchanged in a load lock chamber having a conveyor.

DISCUSSION OF THE RELATED ART

In general, a liquid crystal display (LCD) device is fabricated by repeating a deposition step of a thin film on a substrate, a photolithographic step using a photoresist, a selective etch step of the thin film and a cleaning step of the substrate. These steps for a fabrication process of an LCD device may be performed using an apparatus having a process chamber under an optimum condition. Recently, a cluster including process chambers for treating substrates, a transfer chamber for moving the substrates into and out of the process chambers and a load-lock chamber connected to the transfer chamber for storing the substrates temporarily has been widely used as an apparatus for fabricating an LCD device because of its superior treatment capability of large number of substrates in a short time period. The cluster may be used as a plasma enhanced chemical vapor deposition (PECVD) apparatus or a dry etch apparatus.

FIG. 1 is a schematic view showing a cluster according to the related art. In FIG. 1, a cluster includes a load-lock chamber 20, a transfer chamber 50 and a plurality of process chambers 30. The cluster further includes a pre-heating chamber 40 for heating a substrate 60 before a treatment in the plurality of process chambers 30 and the load-lock chamber 20 is connected to a storing unit 10 where a plurality of substrates 60 are stored. The transfer chamber 50 includes a transfer chamber robot 52 transferring the substrate 60 among the load-lock chamber 20, the process chambers 30 and the pre-heating chamber 40 and the storing unit 10 includes a storing unit robot 12 transferring the substrates 60 to and from the load-lock chamber 20. The transfer chamber robot 52 and the storing unit robot 12 are operated using rotation and linear movement of an arm or using horizontal reciprocation of a conveyor. The pre-heating chamber 40 may be omitted according to the process requirement. In addition, the number of the pre-heating chambers and the load-lock chambers may vary as the process.

FIG. 2 is a schematic cross-sectional view of a load-lock chamber for a cluster according to related art. In FIG. 2, a load-lock chamber 20 includes first and second plates 26 and 28 therein for exchanging substrates 60. FIG. 2 shows a state when a substrate 60 is loaded on the first plate 26 and the second plate 28 under the first plate 26 is vacant. After a substrate is treated in the process chamber 30 (of FIG. 1), the treated substrate is loaded on the second plate 28 by the transfer chamber robot 52 (of FIG. 1). Then, the untreated substrate 60 on the first plate 26 is transferred to the process chamber 30 (of FIG. 1) by the transfer chamber robot 52 and the treated substrate on the second plate 28 is transferred from the load-lock chamber 20 by the storing unit robot 12 (of FIG. 1). The load-lock chamber 20 has first and second doors 22 and 24 for transferring the substrate 60 on its sidewall. Even though not shown in FIG. 2, a driving cylinder may be connected to the first and/or second plates 26 and 28 for mowing the respective plate up and down. In addition, the first and second plates 26 and 28 have a pin 21 on their top surfaces for supporting the substrate 60.

Before treating a substrate 60 in a cluster, a cassette including substrates treated in a previous step such as a cleaning step is loaded on the storing unit 10 (of FIG. 1) and the substrates in the cassette are sequentially transferred to the load-lock chamber 20 by the storing unit robot 12 (of FIG. 1). Moreover, the treated substrate in the load-lock chamber 20 is transferred to the cassette in the storing unit 10 (of FIG. 1).

Generally, before and after a substrate is treated in a cluster, a step for the substrate such as a cleaning step is performed in apparatuses using an interior conveyor and the substrate is transferred between the apparatuses using an exterior conveyor such as an in-line conveyor system. Accordingly, a substrate is transferred from the conveyor to the cassette for a treatment in the cluster and the substrate treated in the cluster is transferred from the cassette to the conveyor. These transfers between the conveyor and the cassette interrupt an excellent performance in process flow. Moreover, since the transfers between the conveyor and the cassette require a long time period, process time increases and throughput decreases.

SUMMARY OF THE INVENTION

Accordingly, the present invention is directed to an apparatus for a liquid crystal display device that substantially obviates one or more of the problems due to limitations and disadvantages of the related art.

An object of the present invention is to provide an apparatus for a large-sized liquid crystal display device reducing a total process time.

Another object of the present invention is to provide an apparatus having an interior conveyor system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for a liquid crystal display device includes: a process chamber for treating a substrate; a load-lock chamber having an interior conveyor; and a transfer chamber connected to the process chamber and the at least one load-lock chamber, the transfer chamber having a substrate-transferring means.

In another aspect, an apparatus for a liquid crystal display device includes: a plurality of process chambers for treating a substrate; at least one load-lock chamber having at least one interior conveyor; and a transfer chamber connected to the plurality of process chambers and the at least one load-lock chamber, the transfer chamber having a substrate-transferring means.

In another aspect, a method of transferring a substrate using an apparatus including a process chamber, a load-lock chamber having an interior conveyor, a transfer chamber, and an conveyor includes: providing the substrate adjacent to the load-lock chamber using the exterior conveyor; transferring the substrate from the exterior conveyor to the load-lock chamber by driving the interior conveyor; transferring the substrate from the load-lock chamber to the process chamber; treating the substrate in the process chamber; transferring the substrate from the process chamber to the load-lock chamber; and transferring the substrate from the load-lock chamber to the exterior conveyor by driving the interior conveyor.

In another aspect, a method of transferring a substrate using an apparatus including a plurality of process chambers, a first load-lock chamber having a first interior conveyor, a second load-lock chamber having a second interior conveyor, a transfer chamber, a first exterior conveyor and a second exterior conveyor includes; providing the substrate adjacent to the first load-lock chamber using the first exterior conveyor; transferring the substrate from the first exterior conveyor to the first load-lock chamber by driving the first interior conveyor; transferring the substrate from the first load-lock chamber to one of the plurality of process chambers; treating the substrate in the one of the plurality of process chambers; transferring the substrate from the one of the plurality of process chambers to the second load-lock chamber; and transferring the substrate from the second load-lock chamber to the second exterior conveyor by driving the second interior conveyor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
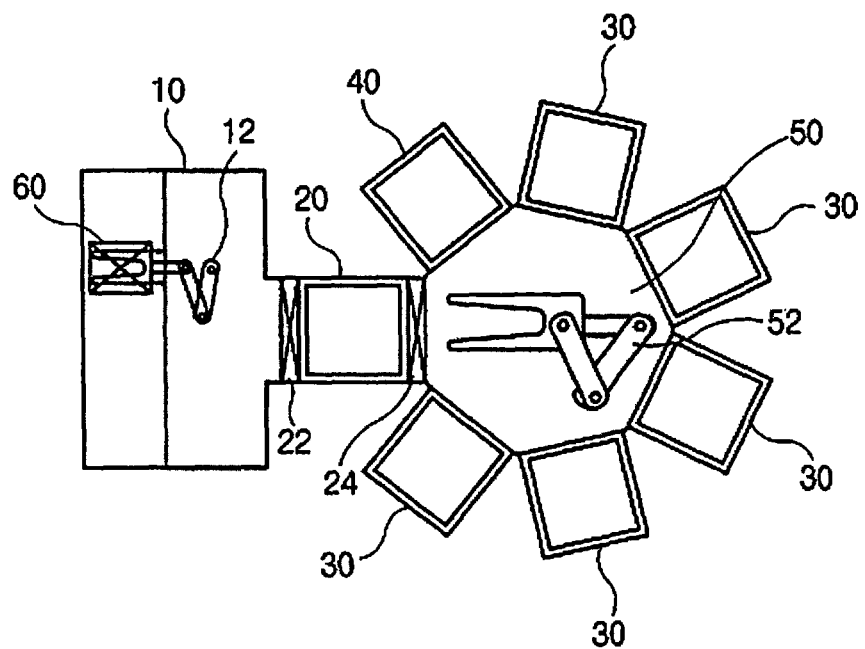
FIG. 1 is a schematic view showing a cluster according to the related art.
Figure 2:
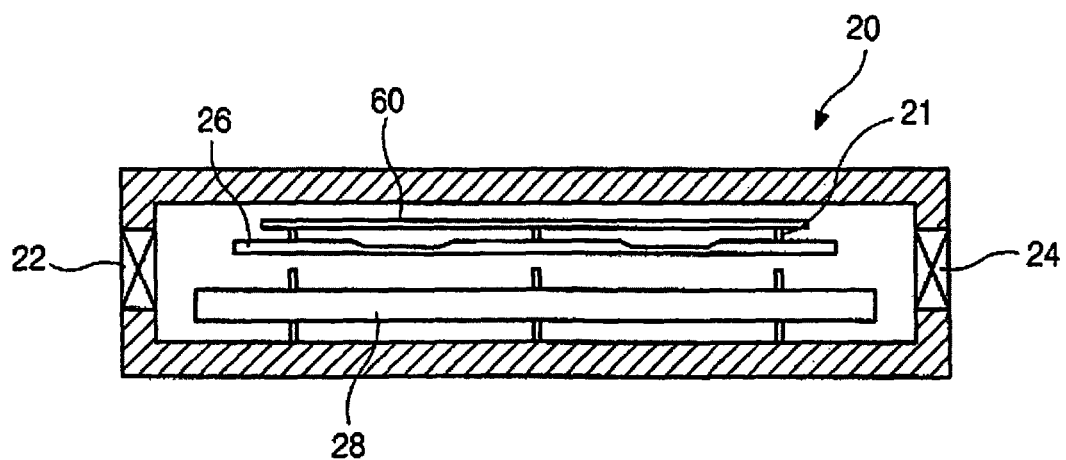
FIG. 2 is a schematic cross-sectional view of a load-lock chamber for a cluster according to related art.
Figure 3:
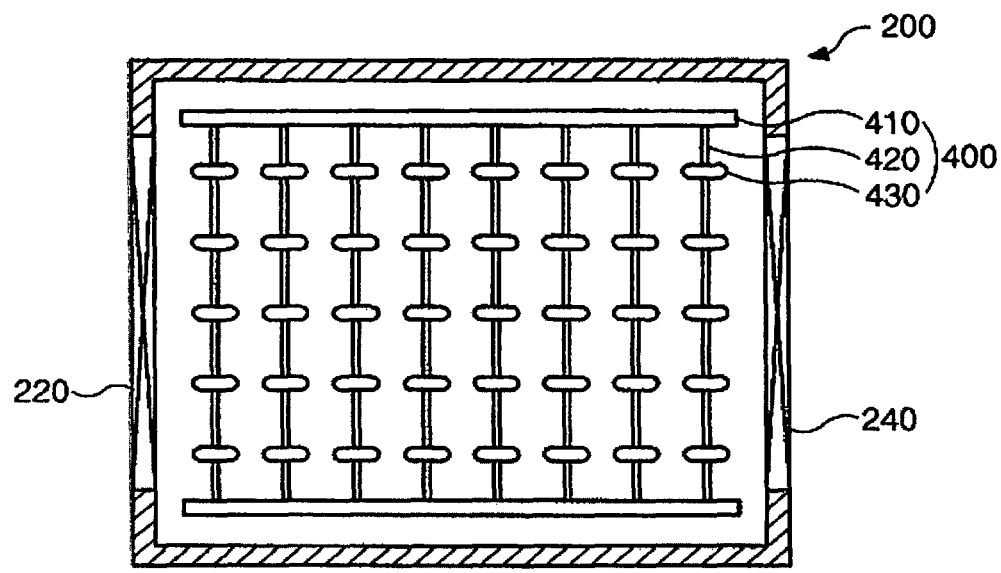
FIG. 3 is a schematic plane view showing a load-lock chamber for a cluster according to an embodiment of the present invention.

FIG. 3 is a schematic plane view showing a load-lock chamber for a cluster according to an embodiment of the present invention.

In FIG. 3, a load-lock chamber 200 has a first door 220 for transfer of a substrate from and to an exterior conveyor and a second door 240 for connection to a transfer chamber on its sidewall. The load-lock chamber 200 includes at least one interior conveyor. FIG. 3 shows only a first interior conveyor 400. The first conveyor 400 has a plurality of rollers 430, a plurality of roller-supporting rods 420 penetrating a central portion of each roller 430, a driving unit (not shown) for supporting two ends of each roller-supporting rod 420 and rotating each roller-supporting rod 420, and a supporter 410 connected to the driving unit. Since a substrate is loaded directly on the plurality of rollers 430, an end portion of each roller 430 is separated from a center of each roller-supporting rod 420 with a predetermined space sufficient for an arm of a transfer chamber robot. In addition, the arm of the transfer chamber robot has a shape so that the arm of the transfer chamber robot can move into and out of the at least one conveyor 400 without contact with each roller 430. For example, the arm of the transfer chamber robot may have a shape of fork.

Figure 4:
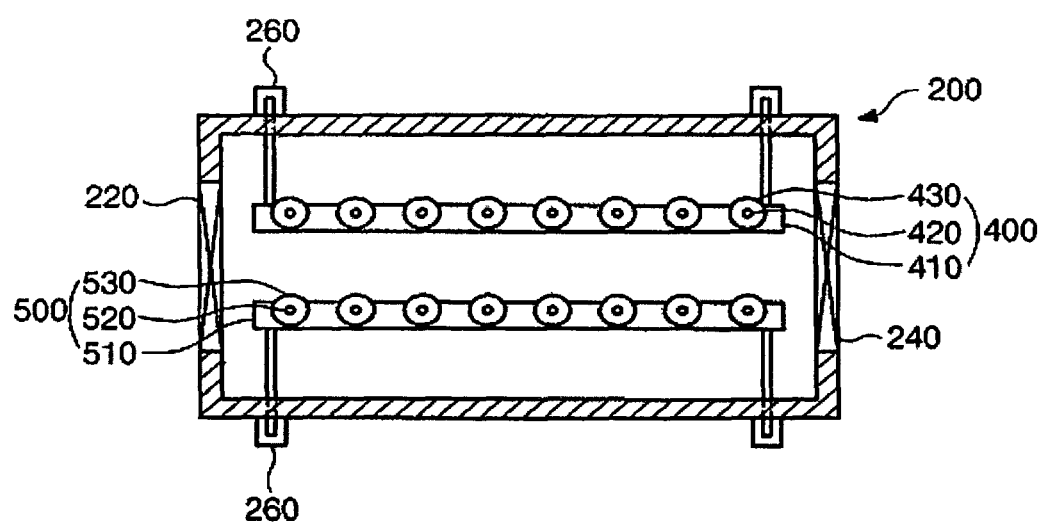
FIG. 4 is a schematic cross-sectional view showing a load-lock chamber for a cluster according to an embodiment of the present invention.

FIG. 4 is a schematic cross-sectional view showing a load-lock chamber for a cluster according to an embodiment of the present invention.

In FIG. 4, the load-lock chamber 200 includes a first interior conveyor 400, a second interior conveyor 500 under the first interior conveyor 400 and an up-and-down driving unit 260 moving the first and second interior conveyors 400 and 500 up and down. The time for exchanging substrates may be reduced by a multi-layered structure of the first and second interior conveyors 400 and 500. When a substrate is transferred from and to an exterior conveyor (not shown), the up-and-down driving unit 260 moves the first and second interior conveyors 400 and 500 to have heights equal to a height of the exterior conveyor. If the height of the exterior conveyor is controllable, the up-and-down driving unit 260 may be omitted.

Figure 5:
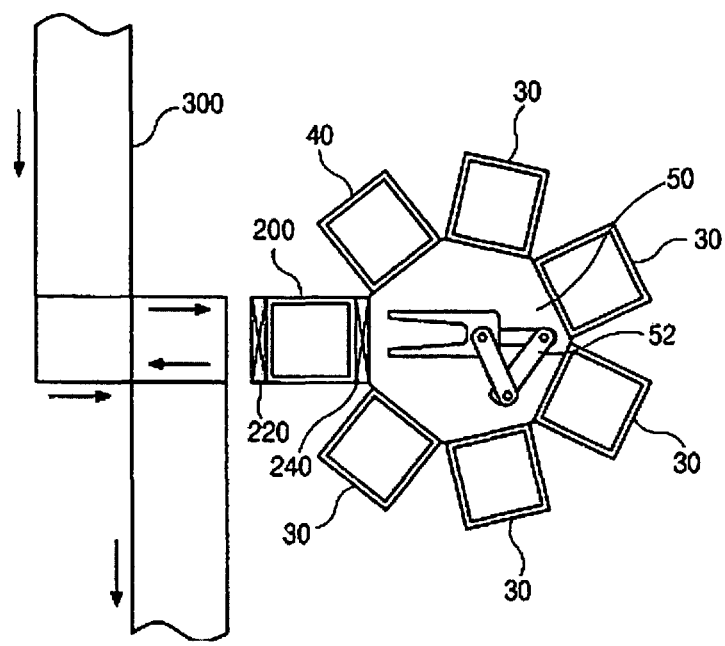
FIG. 5 is a schematic view showing an exemplary layout of an exterior conveyor and a cluster according to an embodiment of the present invention.

FIG. 5 is a schematic view showing an exemplary layout of an exterior conveyor and a cluster according to an embodiment of the present invention.

In FIG. 5, a cluster includes a load-lock chamber 200, a transfer chamber 50 and a plurality of process chambers 30. The cluster may further include a pre-heating chamber 40 for heating a substrate before a treatment in the plurality of process chambers 30. The transfer chamber 50 may include a transfer chamber robot 52 as a substrate-transferring means transferring a substrate among the load-lock chamber 200, the process chambers 30 and the pre-heating chamber 40. The transfer chamber robot 52 may be operated using rotation and linear movement of an arm. The pre-heating chamber 40 may be omitted according to the process requirement and the number of the pre-heating chamber 40 may vary as the process.

In addition, a portion of an exterior conveyor 300 is arranged adjacent to a first door 220 of the load-lock chamber 200. The exterior conveyor 300 may be used for a step prior or posterior to a treating step in the cluster such as a cleaning step. The exterior conveyor 300 may have its own driving unit independent of an up-and-down driving unit for first and second interior conveyors 400 and 500 (of FIG. 4), or the exterior conveyor 300 and the first and second interior conveyors 400 and 500 (of FIG. 4) may be driven by a single driving unit. The substrates are exchanged in the single load-lock chamber 200 and transferred to the exterior conveyor 300 and the transfer chamber 50.

As a whole, the exterior conveyor 300 is directly connected to the transfer chamber robot 52 through the first and second interior conveyors 400 and 500 (of FIG. 4) in the load-lock chamber 200.

Figure 6:
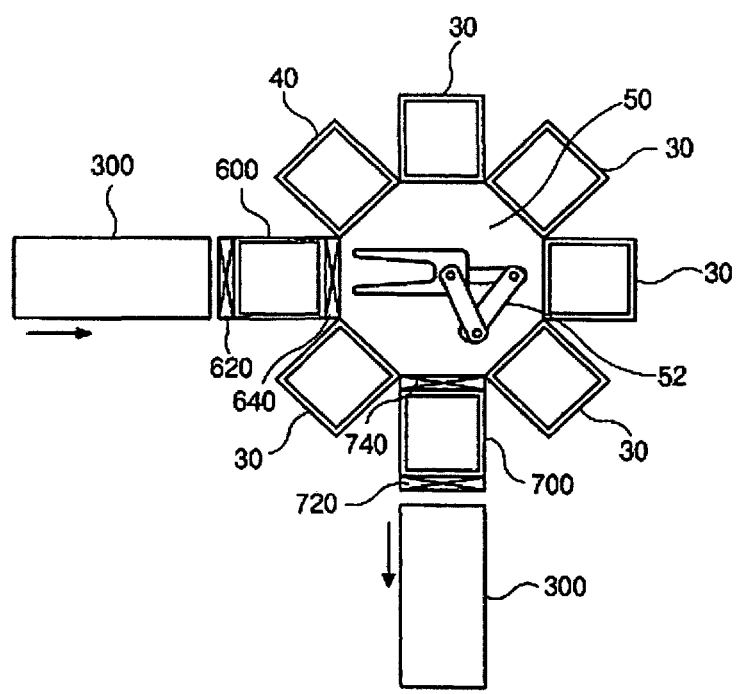
FIG. 6 is a schematic cross-sectional view showing another exemplary layout of an exterior conveyor and a cluster according to an embodiment of the present invention.

FIG. 6 is a schematic cross-sectional view showing another exemplary layout of an exterior conveyor and a cluster according to an embodiment of the present invention.

In FIG. 6, a cluster includes a first load-lock chamber 600, a second load-lock chamber 700, a transfer chamber 50 and a plurality of process chambers 30. The cluster may further include a pre-heating chamber 40 for heating a substrate before a treatment in the plurality of process chambers 30. The transfer chamber 50 may include a transfer chamber robot 52 transferring a substrate among the first load-lock chamber 600, a second load-lock chamber 700, the process chambers 30 and the pre-heating chamber 40. The transfer chamber robot 52 may be operated using rotation and linear movement of an arm. The pre-heating chamber 40 may be omitted according to the process requirement and the number of the pre-heating chamber 40 may vary as the process.

The first load-lock chamber 600 has first and second doors 620 and 640, and the second load-lock chamber 700 has third and fourth doors 720 and 740. Two exterior conveyors 300 are arranged adjacent to the first door 620 of the first load-lock chamber 600 and the third door 720 of the second load-lock chamber 700, respectively. An untreated substrate is transferred from one exterior conveyor 300 to the first load-lock chamber 600 and a substrate treated in the process chambers 30 is transferred from the second load-lock chamber 700 to the other exterior conveyor 300. The substrate is transferred from the exterior conveyor 300 to the transfer chamber 50 in the first load-lock chamber 600, while the substrate is transferred form the transfer chamber 50 to the exterior conveyor 300 in the second load-lock chamber 700. Accordingly, the substrates may not be exchanged in the first and second load-lock chambers 600 and 700. As a result, each of the first and second load-lock chambers 600 and 700 may have a single interior conveyor therein.

When each load-lock chamber 600 and 700 has a single interior conveyor, the untreated substrate transferred from the exterior conveyor 300 may be loaded on an interior conveyor in the first load-lock chamber 600 and then may be transferred to the process chambers 30 by the transfer chamber robot 50. In addition, the substrate treated in the process chambers 30 is loaded on an interior conveyor in the second load-lock chamber 700 by the transfer chamber robot 52. Accordingly, the interior conveyor of the first and second load-lock chambers 600 and 700 may be fixed to have heights equal to respective heights of the exterior conveyors 300.

As a whole, the exterior conveyors 300 are directly connected to the transfer chamber robot 52 through the respective interior conveyors in the first and second load-lock chambers 600 and 700.

FIGS. 7 to 10 are schematic cross-sectional views showing an operation of an exterior conveyor and a cluster of FIG. 5.

Figure 7:
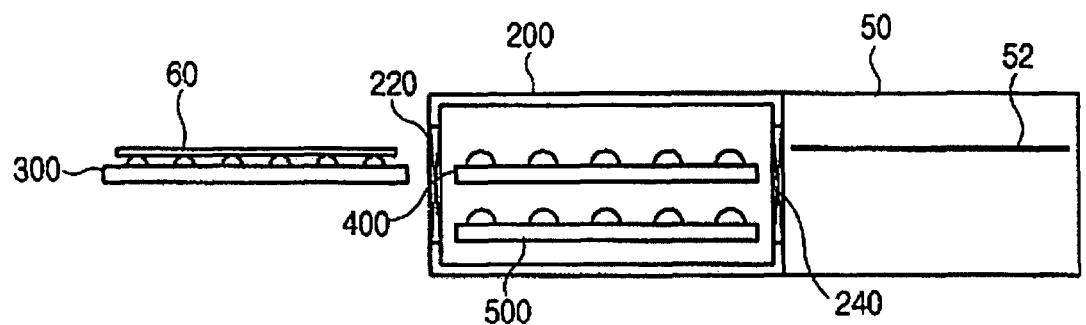
FIGS. 7 to 10 are schematic cross-sectional views showing an operation of an exterior conveyor and a cluster of FIG. 5.

In FIG. 7, a substrate 60 treated in a prior step such as a cleaning step is moved by an exterior conveyor 300 and provided at a front of a first door 220 of a load-lock chamber 200.

Figure 8:
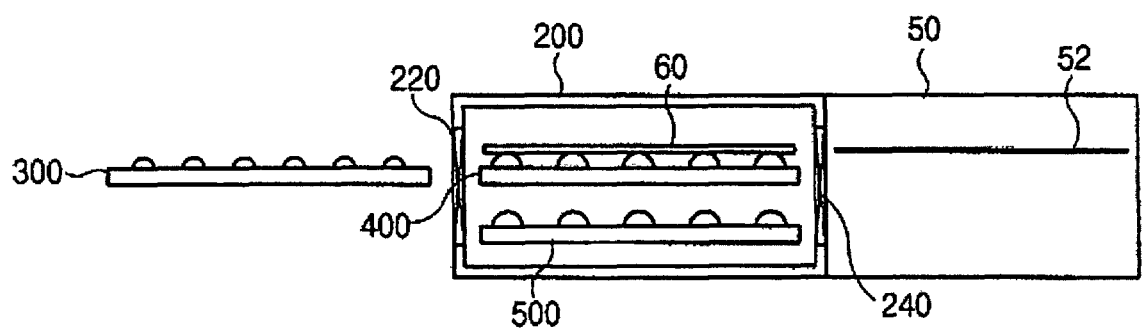

In FIG. 8, the first door 220 is open and the substrate 60 is loaded on a first interior conveyor 400 through the first door 220 by driving the exterior conveyor 300. At the same time, the first interior conveyor 400 may be driven by a driving unit (not shown) to adjust a position of the substrate 60 properly. In addition, the first interior conveyor 400 may be driven by an up-and-down driving unit 260 (of FIG. 4) to have substantially the same height as a height of the exterior conveyor 300.

Figure 9:
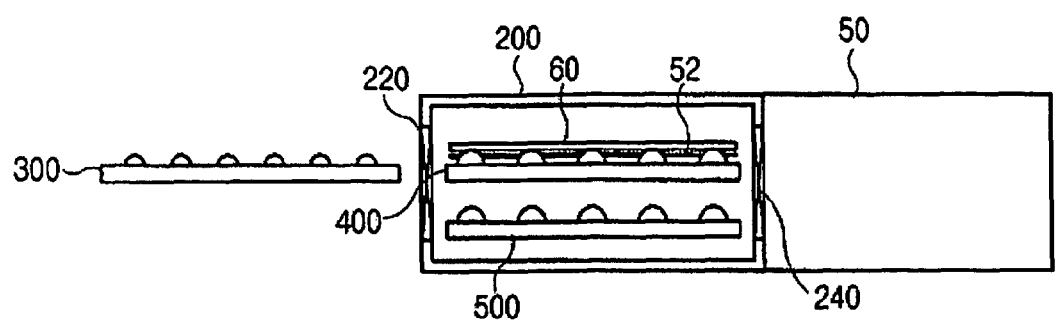

In FIG. 9, after the substrate 60 is completely loaded on the first interior conveyor 400, the first door 220 is closed and the load-lock chamber 200 may be evacuated. Then, a second door 240 is open and a transfer chamber robot 52 of a transfer chamber 50 is disposed under the substrate 60.

Figure 10:
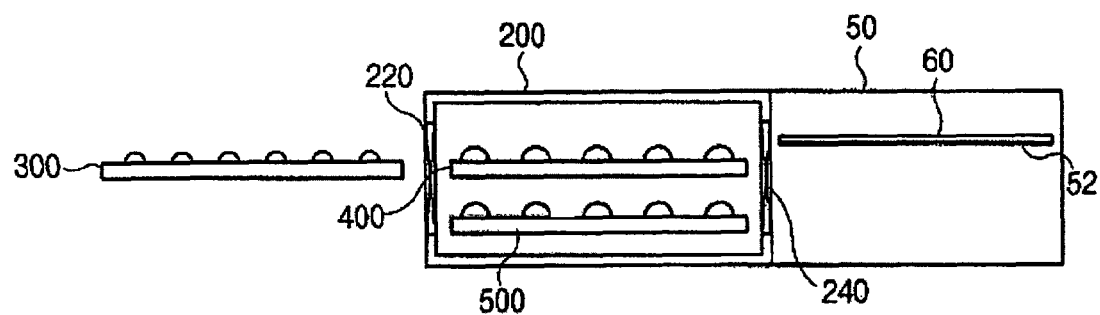

In FIG. 10, the substrate 60 is transferred to the transfer chamber 50 by the transfer chamber robot 52.

Then, the substrate 60 is transferred to a plurality of process chambers 30 (of FIG. 5) and is treated for a step such as a deposition step and an etch step. After finishing the treatment step in the process chambers 30 (of FIG. 5), the substrate 60 is transferred to the load-lock chamber 200 by the transfer chamber robot 52 and is loaded on a second interior conveyor 500. Then, the second door 240 is closed and the load-lock chamber 200 is pressurized to have an atmospheric pressure. Then, the first door 220 is open and the substrate 60 is transferred to the exterior conveyor 300 through the first door 220 by driving the second interior conveyor 500. At the same time, the exterior conveyor 300 may be driven by a driving unit (not shown) to adjust a position of the substrate 60 properly. In addition, the second interior conveyor 500 may be driven by an up-and-down driving unit 260 (of FIG. 4) to have substantially the same height as a height of the exterior conveyor 300.

Consequently, since a load-lock chamber has an interior conveyor therein, a substrate treated in a prior step is transferred from an exterior conveyor directly to a load-lock chamber and a substrate treated in a process chamber of a cluster is transferred from a load-lock chamber directly to an exterior conveyor. Accordingly, a storing unit for substrates, a storing unit robot and a cassette are not required, thereby production cost and fabrication time reduced.

It will be apparent to those skilled in the art that various modifications and variations can be made in the apparatus having a conveyor without departing from the spirit or scope of the invention. Thus, it is intended that the present invention covers the modifications and variations of this invention provided they come within the scope of the appended claims and their equivalents.

What is claimed is:

1. An apparatus for a liquid crystal display device, comprising:
    a process chamber for treating a substrate, wherein the process chamber is a deposition chamber configured to treat the substrate for a deposition step or an etch chamber configured to treat the substrate for an etch step;
    a load-lock chamber having an interior conveyor, the interior conveyor including a plurality of rollers directly on which the substrate is loaded;
    an exterior conveyor adjacent to the load-lock chamber, the substrate capable of being transferred from the exterior conveyor to the interior conveyor in a first direction and from the interior conveyor to the exterior conveyor in a second direction opposite to the first direction; and
    a transfer chamber connected to the process chamber and the load-lock chamber, the transfer chamber having a substrate-transferring means.

2. The apparatus according to claim 1, wherein the exterior conveyor and the interior conveyor are driven by respective driving units.

3. The apparatus according to claim 1, wherein the load-lock chamber has a first door adjacent to the exterior conveyor and a second door adjacent to the transfer chamber.

4. The apparatus according to claim 1, wherein the interior conveyor has first and second interior conveyors.

5. The apparatus according to claim 4, wherein the first interior conveyor stacks on the second conveyor, wherein the first and second interior conveyors each include roller supporting rods and a supporter, and wherein the first interior conveyor is entirely spaced apart from the second interior conveyor in a vertical direction.

6. The apparatus according to claim 4, wherein the substrate is transferred from the exterior conveyor to the transfer chamber through the first interior conveyor and the substrate is transferred from the transfer chamber to the exterior conveyor through the second interior conveyor.

7. The apparatus according to claim 1, wherein the exterior conveyor has first and second exterior conveyors, and the load-lock chamber has a first load-lock chamber adjacent to the first exterior conveyor and a second load-lock chamber adjacent to the second exterior conveyor.

8. The apparatus according to claim 7, wherein the first load-lock chamber has a first door adjacent to the first exterior conveyor and a second door adjacent to the transfer chamber, and the second load-lock chamber has a third door adjacent to the second exterior conveyor and a fourth door adjacent to the transfer chamber.

9. The apparatus according to claim 8, wherein the interior conveyor has a first interior conveyor in the first load-lock chamber and a second interior conveyor in the second load-lock chamber.

10. The apparatus according to claim 8, wherein the substrate is transferred from the first exterior conveyor to the first interior conveyor through the first door and is transferred from the transfer chamber to the second interior conveyor through the fourth door.

11. The apparatus according to claim 1, further comprising an up-and-down driving unit moving the interior conveyor up and down.

12. The apparatus according to claim 1, wherein the substrate-transferring means is a robot arm rotating and linearly moving.

13. The apparatus according to claim 12, wherein the interior conveyor comprises a plurality of roller-supporting rods penetrating a central portion of each roller and wherein an end portion of each roller is separated from the center of each roller supporting rods with a space for the robot arm.

14. The apparatus according to claim 13, wherein the robot arm moves without contact with each roller.

15. The apparatus according to claim 1, wherein the interior conveyor is driven by a roller.

16. The apparatus according to claim 1, wherein the exterior conveyor comprises a second plurality of rollers and a plurality of roller-supporting rods penetrating a central portion of each second roller.

17. The apparatus according to claim 1, wherein the load-lock chamber is evacuated when the substrate is transferred from the exterior conveyor to the load-lock chamber and wherein the load-lock chamber is pressured when the substrate is transferred from the process chamber to the load-lock chamber through the transfer chamber.

18. An apparatus for a liquid crystal display device, comprising:
a plurality of process chambers for treating a substrate, wherein the process chamber is a deposition chamber configured to treat the substrate for a deposition step or an etch chamber configured to treat the substrate for an etch step;
at least one load-lock chamber having at least one interior conveyor, the at least one interior conveyor including a plurality of rollers directly on which the substrate is loaded;
an exterior conveyor adjacent to the load-lock chamber, the substrate capable of being transferred from the exterior conveyor to the interior conveyor in a first direction and from the interior conveyor to the exterior conveyor in a second direction opposite to the first direction; and
a transfer chamber connected to the plurality of process chambers and the at least one load-lock chamber, the transfer chamber having a substrate-transferring means.

19. A method of transferring a substrate using an apparatus including a process chamber, a load-lock chamber having an interior conveyor, a transfer chamber, and an exterior conveyor adjacent to the load-lock chamber wherein the substrate is transferable from the exterior conveyor to the interior conveyor in a first direction and from the interior conveyor to the exterior conveyor in a second direction opposite to the first direction, comprising;
providing the substrate adjacent to the load-lock chamber using the exterior conveyor;
transferring the substrate from the exterior conveyor to the load-lock chamber by driving the interior conveyor, the interior conveyor including a plurality of rollers directly on which the substrate is loaded;
transferring the substrate from the load-lock chamber to the process chamber to treat the substrate for a deposition step or an etch step;
treating the substrate in the process chamber by subjecting the substrate to a deposition process or an etch process;
transferring the substrate from the process chamber to the load-lock chamber; and
transferring the substrate from the load-lock chamber to the exterior conveyor by driving the interior conveyor.

20. The method according to claim 19, further comprising;
evacuating the load-lock chamber after transferring the substrate from the exterior conveyor to the load-lock chamber; and
pressurizing the load-lock chamber after transferring the substrate from the process chamber to the load-lock chamber.

21. The method according to claim 19, wherein the interior conveyor has first and second conveyors, wherein the substrate transferred from the exterior conveyor is loaded on the first interior conveyor and the substrate transferred from the process chamber is loaded on the second interior conveyor.

22. An apparatus comprising:
a process chamber for treating a substrate, wherein the process chamber is a deposition chamber configured to treat the substrate for a deposition step or an etch chamber configured to treat the substrate for an etch step;
a single load-lock chamber having an interior conveyor, the interior conveyor including a plurality of rollers directly on which the substrate is loaded;
a single exterior conveyor adjacent to the single load-lock chamber,
wherein the substrate is transferable from the single exterior conveyor to the single load-lock chamber in a first direction and from the single load-lock chamber to the single exterior conveyor in a second direction opposite to the first direction; and
a transfer chamber connected to the process chamber and the single a load-lock chamber,
wherein the interior conveyor comprises a plurality of roller-supporting rods penetrating a central of each roller.

23. The apparatus of claim 22, wherein at least one of the plurality of rollers has a first long axis and a first short axis in plan view and at least one of the plurality of roller-supporting rods has a second long axis and a second short axis in plan view, and wherein the first long axis is perpendicular to the second long axis.

* * * * *